United States Patent
Mo et al.

(10) Patent No.: US 8,466,991 B2
(45) Date of Patent: Jun. 18, 2013

(54) OPTICAL BLACK PIXEL CELL READOUT SYSTEMS AND METHODS

(75) Inventors: Yaowu Mo, San Ramon, CA (US); Chen Xu, San Jose, CA (US); Yandong Chen, Mountain View, CA (US)

(73) Assignee: Aptina Imaging Corporation, George Town, Grand Cayman (KY)

( * ) Notice: Subject to any disclaimer, the term of this patent is extended or adjusted under 35 U.S.C. 154(b) by 338 days.

(21) Appl. No.: 12/838,705

(22) Filed: Jul. 19, 2010

(65) Prior Publication Data

US 2012/0013780 A1    Jan. 19, 2012

(51) Int. Cl.
*H04N 9/64*   (2006.01)
*H04N 5/335*   (2006.01)

(52) U.S. Cl.
USPC .......................................... 348/243; 348/308

(58) Field of Classification Search
USPC ........................ 348/241, 243, 248, 302, 308
See application file for complete search history.

(56) References Cited

U.S. PATENT DOCUMENTS

| | | | |
|---|---|---|---|
| 8,179,461 B2 * | 5/2012 | Suzuki et al. | 348/294 |
| 2006/0250513 A1 * | 11/2006 | Yamamoto et al. | 348/294 |
| 2007/0001098 A1 * | 1/2007 | Sano | 250/208.1 |
| 2010/0201856 A1 * | 8/2010 | Hayashi et al. | 348/296 |
| 2011/0025871 A1 * | 2/2011 | Yoshioka | 348/222.1 |
| 2011/0221938 A1 * | 9/2011 | Leung et al. | 348/243 |

* cited by examiner

*Primary Examiner* — Trung Diep
(74) *Attorney, Agent, or Firm* — Kramer Levin Naftalis & Frankel LLP (57) ABSTRACT

This is generally directed to systems and methods for reading optical black pixel cells. For example, in some embodiments, the columns of a pixel array can be shunted together during an optical black pixel readout phase of the imaging system. This may, for example, help improve correction of column fixed pattern noise or other noise. In some embodiments, the column may be shunted together during the optical black pixel readout phase of the imaging system and not shunted during other phases of the imaging system (e.g., when reading values from active pixel cells, barrier pixel cells, etc.). In some embodiments, circuitry for providing the column shunting can be implemented as an independent block of the imaging system. In other embodiments, this circuitry can be implemented within other blocks of the imaging system. As an illustration, the shunting circuitry can be implemented within a VLN block of the imaging system.

19 Claims, 6 Drawing Sheets

OPTICAL BLACK PIXEL CELL READOUT SYSTEMS AND METHODS

FIELD OF THE INVENTION

The present invention relates to optical black pixel cell readout systems and methods. In particular, the present invention relates to systems and methods for coupling columns of a pixel array during an optical black pixel cell readout phase of an imaging system.

BACKGROUND OF THE INVENTION

Imaging systems today often include an array of pixel cells arranged in a predetermined number of columns and rows. Each of the pixel cells can be configured to sense an amount of light impinging on that pixel cell, and generate an appropriate signal corresponding to that amount of sensed light.

Such imaging systems, however, can exhibit inaccuracies or noise in the amount of sensed light. For example, "fixed pattern noise" is one exemplary type of noise that can affect pixel arrays. Fixed pattern noise generally has a repeatable pattern and is temporally constant, meaning that the noise pattern remains substantially the same as time passes (e.g., remains constant through different image frames). Fixed pattern noise may be a result of, for example, the differences in the circuitry used in processing and/or collecting a signal from each of the pixel cells. As another example, imaging systems can also exhibit "temporal noise," which can include noise that does change as time passes. Accordingly, to account for such noise within the imaging system, imaging systems can include various circuitry and/or processes for reducing or eliminating the noise.

DETAILED DESCRIPTION OF THE INVENTION

Discussed herein are systems and methods for reading optical black pixel cells. For example, in some embodiments, the columns of a pixel array can be shunted together during an optical black pixel readout phase of the imaging system. This may, for example, help improve correction of fixed pattern noise or other noise within the imaging system. In some embodiments, the column may be shunted together during the optical black pixel readout phase of the imaging system and not shunted during other phases of the imaging system (e.g., when reading values from active pixel cells, barrier pixel cells, and the like). In some embodiments, the columns can be shunted together within the VLN circuitry of the pixel array.

Generally, an imaging system can include an array of pixel cells arranged in a predetermined number of columns and rows. Active pixel cells of the pixel array can be configured to receive incident photons and convert these photons into electrical signals. For example, each active pixel cell can include photosensitive elements such as photodiodes, photogates, photoconductors, and the like that can accumulate an amount of charge based on the sensed light (e.g., based on the number of incident photons) and generate an electrical signal to represent the accumulated charge. In some embodiments, the pixel cells can respond to a single color. For example, in some embodiments, a pixel array can include pixel cells that each respond to one of blue, green, or red light. In this case, the pixel cells can be arranged in a Bayer pattern or in any other suitable pattern.

Figure 1:
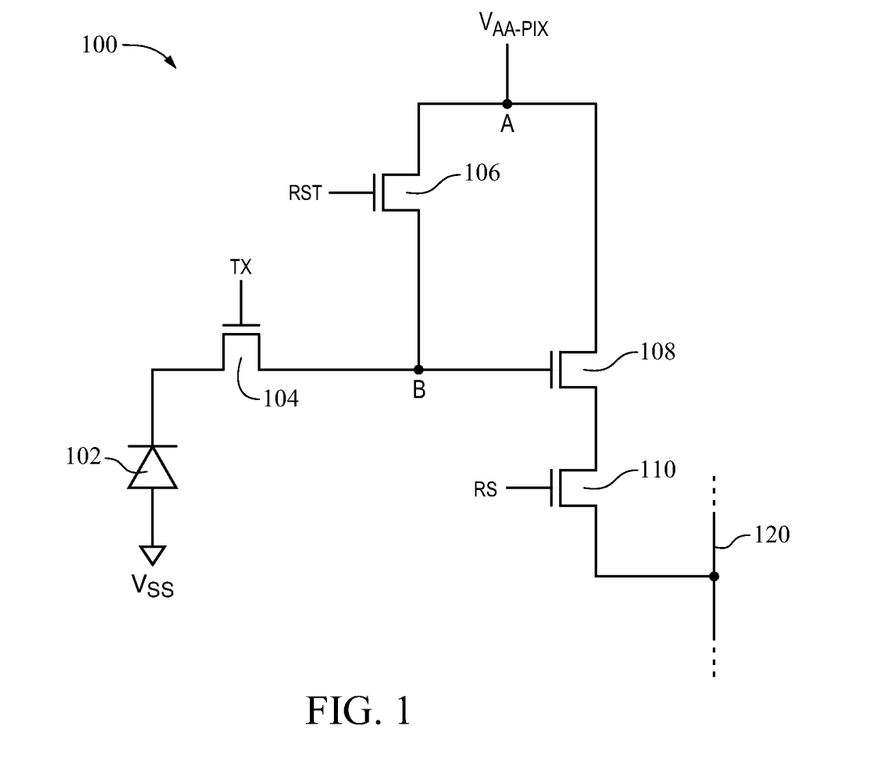
FIG. 1 shows a schematic view of an illustrative pixel cell in accordance with some embodiments of the invention.

For example, FIG. 1 shows an illustrative schematic view of active pixel cell 100 that can be included in a pixel array of an imaging system. Pixel cell 100 is depicted in FIG. 1 as a 4-transistor ("4T") active pixel. However, although pixel cell 100 is depicted as such and although the disclosures herein may refer to the particular example of a 4T active pixel, this is for the purpose of illustration and not for limitation. Rather, one skilled in the art should appreciated that the present invention could alternatively or additionally be implemented with any suitable pixel design, such as, for example, a 3T active pixel, a 5T active pixel, a charge-coupled device ("CCD") imaging system, or any other suitable pixel design or imaging system.

Pixel cell 100 can include a light sensitive element 102. For example, light sensitive element 102 is illustrated in FIG. 1 as a diode. However, light sensitive element 102 could alternatively be any suitable device for sensing light, such as photogates, photoconductors, and the like. Pixel cell 100 can also include four transistors: transfer transistor 104, reset transistor 106, source follower 108, and row select transistor 110. The conductivity of transfer transistor 104 can be controlled by a TX control signal, the conductivity of reset transistor 106 can be controlled by a RST control signal, and the conductivity of row select transistor 110 can be controlled by a RS control signal.

The voltage of floating diffusion region B is buffered by source follower 108, whose bias current is provided by column VLN circuitry. The output of source follower 108 can be output to column line 120 in response to row select transistor 110 being turned on. In other words, in order to read the signal value produced by pixel cell 100, pixel cell 100 can be chosen by applying the appropriate RS control signal to enable row select transistor 110. This, in turn, can turn on row select transistor 110, thereby allowing signals generated by pixel cell 100 to pass to column line 120. As mentioned above, the pixel cells of a pixel array can be arranged in rows and columns, where each column can include a column line (e.g., column line 120) coupling the pixel cells of that column together. Moreover, column line 120 can couple to any appropriate column circuitry for reading and/or processing the signals generated by pixel cell 100 (e.g., or any other pixel cells of that column). For example, as used herein the term "column circuitry" can refer to one or more of voltage line ("VLN") bias circuitry, amplifiers, samples and hold circuitry, signal storage circuitry (e.g., capacitors), column select circuitry, multiplexers, and the like.

During operation of pixel cell 100, the RS control signal may be asserted to cause row select transistor 110 to conduct, thus "choosing" pixel cell 100 for suitable processing. The value of pixel cell 100 can be reset without destroying photoelectrons accumulated in light sensitive element 102. For example, the value of pixel cell 100 can be reset by turning on reset transistor 106 while transfer transistor 104 is turned off (e.g., by asserting the RST control signal while the TX control signal is not asserted). This can result in coupling the floating diffusion region B to node A, where node A is coupled to the pixel array's power (referred to herein as "$V_{AA-PIX}$"). Thus, the value of the floating diffusion region B can be reset to the value $V_{AA-PIX}$. The value of pixel cell 100 can then be sampled and held (e.g., by appropriate column circuitry coupled to column line 120) by asserting a SHR command signal, resulting in the reference signal, "$V_{RST}$."

After the $V_{RST}$ signal has been output, reset transistor 106 can be turned off (e.g., by de-asserting the RST command signal). Then, transfer transistor 104 can be turned on by pulsing the TX control signal (e.g., while reset transistor 106 is still off), thereby coupling light sensitive element 102 to floating diffusion region B. The value of pixel cell 100 can then be sampled and held (e.g., by appropriate column circuitry coupled to column line 120) by asserting a SHS command signal, resulting in the signal level, "$V_{SIG}$." A final output signal for pixel cell 100 can then be determined by taking the difference of the reference level and the signal level, $V_{OUT}=V_{RST}-V_{SIG}$. $V_{OUT}$ may, for example, correspond to the amount of charge accumulated by pixel cell 100, where the charge is allowed to accumulate for a period of time referred to herein as the "integration period." Generally, this integration period can end on the falling edge of the above-mentioned TX pulse (e.g., the TX pulse occurring between the sampling and holding of the $V_{RST}$ and the $V_{SIG}$ signals through the SHR and SHS command signals, respectively). The beginning of the integration period can occur during an imaging system's shutter phase by pulsing the TX and RST command signals simultaneously. In particular, the integration period can begin at the failing edge of the shutter phase's TX command signal. In some embodiments, the RST pulse of the shutter phase may be slightly wider than and encompass the TX pulse. The length of time of the integration period may, for example, be determined based on how long charge should be allowed to accumulate at light sensing element 102. In response to the integration period ending, A final output signal for pixel cell 100 can then be determined by taking the difference of the reference level and the signal level, $V_{OUT}=V_{RST}-V_{SIG}$.

Imaging systems can experience various types of errors and noise during their operation. For example, imaging systems can experience pixel temporal noise (e.g., noise that may change from frame to frame), fixed pattern noise (e.g., noise that generally does not change over time and exhibits a fixed pattern across the pixel array), or both. One type of fixed pattern noise ("FPN") can include "column structure noise" that can result from the column circuitry of each column and from horizontal shading stemmed within the pixel array, such as a horizontal voltage gradient of ground within the pixel array and a horizontal voltage gradient of control signals driven by row-drivers. For example, due to differences in the VLN bias circuitry, amplifiers, samples and hold circuitry, multiplexers, or other suitable column circuitry, each column may respond differently even when the pixel cells of each column are receiving an identical input. As an illustration, the amplifiers may have different offset voltages from column to column, thus causing differences in the column responses. As mentioned above, in some embodiments, column structure noise can also be caused by horizontal shading stemmed within the pixel array, such as a horizontal voltage gradient of ground within the pixel array, and a horizontal voltage gradient of control signals driven by row-drivers.

Accordingly, to provide accurate and high-quality imaging systems, the column structure noise and other noise within the system should be reduced or eliminated. Moreover, especially in video applications, the human eye tends to notice fixed pattern noise more readily than pixel temporal noise, since the fixed pattern noise remains constant from frame to frame of the video. Accordingly, fixed pattern noise should generally be controlled and reduced more stringently than pixel temporal noise. As an illustration, generally an imaging system can be designed to have a root-mean-square ("RMS") ratio of pixel temporal noise to column structure noise of at least 8:1 in order to produce acceptable images and videos (e.g., images and videos with a suitably low amount of noise detectable by the human eye). As another illustration, for high performance sensors, a ratio of 10:1 can be used. Alternatively, any other suitable RMS ratio of pixel temporal noise to column structure noise can be used to design the imaging system.

To help reduce column structure noise (e.g., and thus produce a better RMS ratio of pixel temporal noise to column structure noise), in some embodiments, imaging systems can utilize "optical black pixel cells" (e.g., also referred to herein as "black pixel cells" or "black pixels"). Black pixel cells are pixel cells that can be used as reference pixels for an imaging system. The black pixel cells may have virtually the same electrical characteristics and responses as a standard, active pixel, yet are insensitive to light. For example, a schematic diagram for a black pixel cell may look identical to active pixel cell 100 of FIG. 1, except that light-sensitive element 102 can be covered with metal or otherwise suitably rendered unresponsive to light. In this manner, a black pixel cell may respond in the same manner an active pixel cell would, were that active pixel cell in complete darkness. As used herein, the term "active pixel cell" or "active pixel" can refer to a pixel cell that is responsive to light and can be used in directly sensing and forming the image. This is in contrast to black pixel cell which may only be used to indirectly form the image by, for example, being used in the image's processing to maintain constant black levels independent of gain, illumination, changes in the environment, to reduce noise, and the like.

Figure 2:
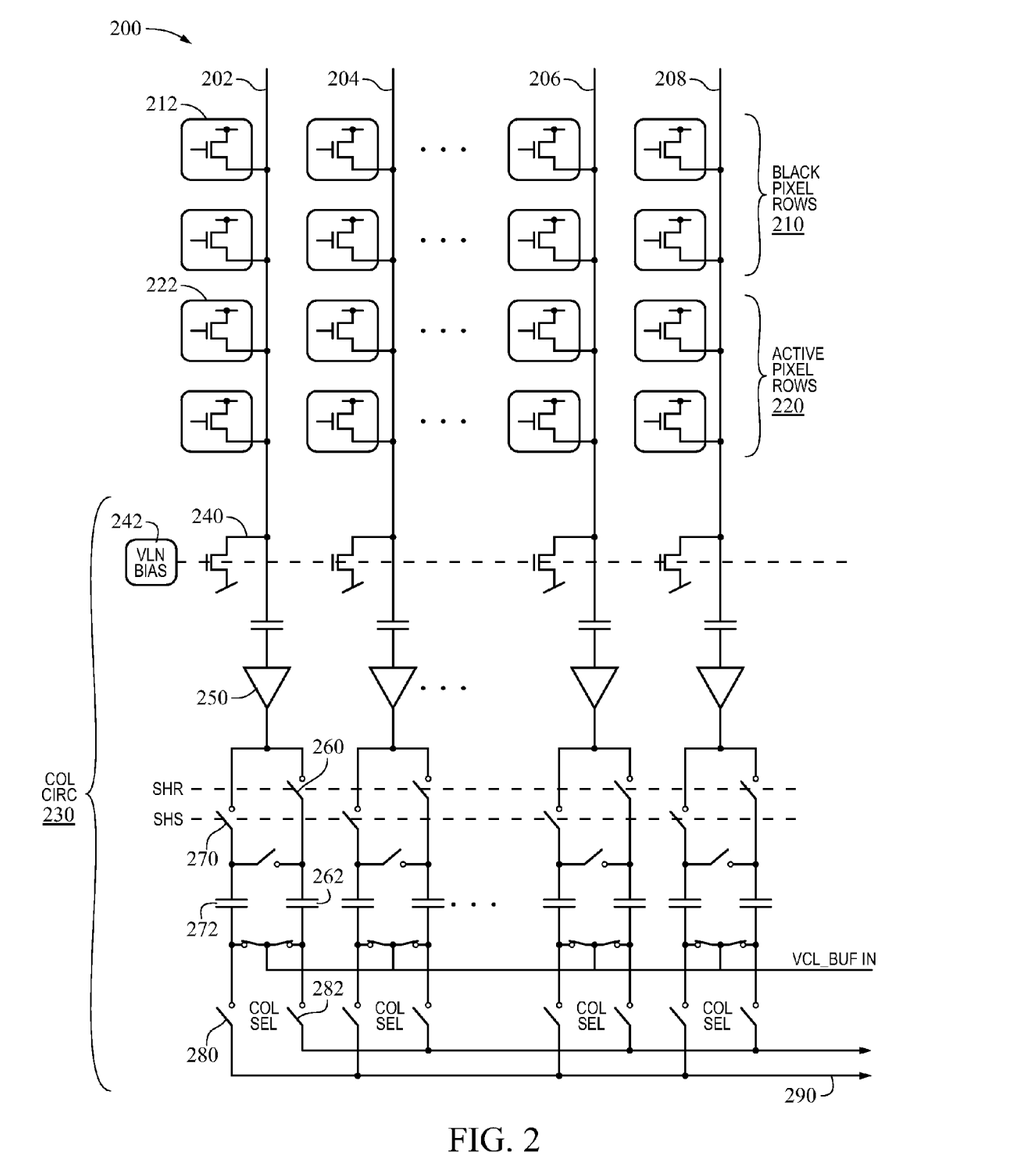
FIG. 2 shows a schematic view of an illustrative imaging system including optical black pixel cells and active pixel cells in accordance with some embodiments of the invention.

Oftentimes, one or more black pixel cells can be included in each column of the pixel array. For example, FIG. 2 shows a schematic view of imaging system 200 that can include black pixel cells and active pixel cells. Imaging system 200 can include one or more column lines, such as column lines 202, 204, 206, and 208. These column lines may, for example, correspond to column line 120 of FIG. 1. Imaging system 200 can also include one or more rows of black pixel cells and active pixel cells, such as black pixel cell rows 210 and active pixel cell rows 220, respectively. Each instance of black pixel cell (e.g., instance 212 and the like) and each instance of active pixel cell (e.g., instance 222 and the like) may correspond to a pixel cell such as pixel cell 100 of FIG. 1 (e.g., where the black pixel cells may have metal covering light-sensitive element 102 or are otherwise rendered unresponsive to light). Moreover, although FIG. 2 illustrates the instances of the black pixel cells as being arranged in rows that are positioned above rows of the active pixel cells, this is for the purpose of illustration and is not limiting. Rather, one skilled in the art could appreciate that any suitable configuration and/or number of black pixel cells and active pixel cells could alternatively be used. For example, rather than being configured in rows, the black pixel cells can be positioned randomly or in other non-row patterns throughout the pixel array. As another example, black pixel cell rows 210 could be positioned below, to the right of, and/or to the left of active pixel cell rows 220. In some embodiments, imaging system 200 can include a system with both top and bottom signal readout such as, for example, where the bottom signal readout may be for a single color.

Each column line (e.g., column lines 202, 204, 206, and 208) may couple to its respective column circuitry 230. As an illustration, the column circuitry of column line 202 can include VLN bias circuitry 240, VLN Bias control 242, amplifier 250, SHR select 260, SHR storage 262, SHS select 270, SHS storage 272, and column selects 280 and 282. The remaining columns of imaging system 200 may each be coupled to similar column circuitry. Moreover, any other suitable circuitry and/or configuration of column circuitry 230 can be included in imaging system 200.

VLN bias circuitry 240 can provide a suitable bias current for column line 202 during sampling of signals from that column's pixel cells. For example, VLN bias circuitry 240 can provide a source follower (e.g., source follower 108 of FIG. 1) with a suitable bias current when a VRST or VSIG signal is being read. VLN bias circuitry can be controlled by VLN bias control 242. SHR select 260 can include any suitable switch, transistor, multiplexer, or the like for coupling the pixel cell's output signal to storage 262 during the sampling of the $V_{RST}$ signal. For example, SHR select 260 can be enabled by the SHR control signal. Similarly, SHS select 270 can include any suitable switch, transistor, multiplexer, or the like for coupling the pixel cells output signal to storage 272 during the sampling of the $V_{SIG}$ signal. As an example, SHS select 270 can be enabled by the SHS control signal. Storages 262 and 272 can include any suitable devices, such as a capacitor, for storing the $V_{RST}$ and $V_{SIG}$ signals, respectively. Column selects 280 and 282 can include any suitable switches, transistors, multiplexers or the like for selecting their respective column such that the $V_{RST}$ and $V_{SIG}$ signals of that column's pixel cells can be output on lines 290 for further processing. For example, lines 290 can provide the signals from the pixel array to one more amplifiers, analog to digital converters, or any other suitable image processing circuitry.

As mentioned above, imaging systems can exhibit column structure noise or other forms of fixed pattern noise. In particular, each column of the pixel array may have a different level of column fixed pattern noise (e.g., the fixed pattern noise of pixel array can vary horizontally across the pixel array). In some embodiments, to correct for such column fixed pattern noise, one or more black pixel cells of the same column can be read and sampled during the readout of an image. In some cases, the black pixel cells of the column can be read and sampled multiple times during this readout of the image. The samples from the black pixel cells of a column may then be averaged to calculate an average noise value.

As mentioned above, these samples can exhibit various forms of noise, such as random noise in the time domain (e.g., pixel temporal noise) and fixed pattern noise. When the samples are averaged, the pixel temporal noise portions of the samples can each be viewed as a random variable. Accordingly, when these samples are average, since the pixel temporal noise behaves as a random variable then the noise power of the pixel temporal noise can be greatly reduced. For example, when 64 samples are used, the noise power of the pixel temporal noise can be reduced by a factor of 64 and the standard deviation can be reduced by a factor of 8. However, since fixed pattern noise (e.g., such as column structure noise) is not affected by the averaging, averaging the samples can result in the column FPN becoming more prominent in comparison to the pixel temporal noise. For this reason, the average value of the optical black samples may sometimes be referred to herein as the "average column FPN" for that column. In some cases, column FPN can be the deterministic part of the pixel outputs from that column, and therefore it can be desirable to obtain a more accurate measurement of the column FPN noise. Accordingly, by averaging the optical black pixel cell samples, the pixel temporal noise can be reduced, thus allowing an imaging system to obtain a more accurate measurement of the column FPN noise portion of the samples.

After averaging the optical black pixel cell samples, the average column FPN can be compared to a pre-defined reference level, where the difference between that column's average FPN and the reference level can be described by a calculated "coefficient factor." Therefore, this coefficient factor can describe a column's level of column FPN with regards to the rest of the pixel array, and can be used to compensate (e.g., correct for) column-wise fixed pattern noise in the imaging system.

As mentioned above, generally a RMS ratio of pixel temporal noise to column structure noise of 8:1 or higher can be used to produce acceptable images (e.g., images with a suitably low amount of noise detectable by the human eye). In other words, reducing the noise power of pixel temporal noise by a factor of 8^2=64 (e.g., or greater) can reveal any column FPN whose noise-magnitude is larger than ⅛ of the pixel temporal noise. This ratio can be defined in terms of pixel temporal noise through the equation:

$$RMS \text{ Ratio} = \frac{\sigma_{Pix}}{\sqrt{\frac{\sum_{i=1}^{N} \sigma_{Pix,i}^2}{N}}} = \frac{\sigma_{Pix}}{\left(\frac{\sigma_{Pix}}{\sqrt{N}}\right)} = \sqrt{N} \qquad 1$$

where $\sigma_{Pix}$ is the pixel cell temporal noise and N is the number of samples. In some embodiments, equation (1) can correspond to cases when the black pixel cells and the active pixel cells are completely correlated. Solving equation (1) for a RMS ratio of 8:1 results in a value of N=64. In other words, to produce a RMS ratio of 8:1 for the imaging system, 64 samples should be obtained for each column from that column's black pixel cells. In cases where the pixel array can include pixel cells that each respond to a particular color (e.g., such as when the pixel cells are arranged in a Bayer pattern), then 64 samples can be received for each color of the pixel array. For example, each column may generate 64 samples from black pixel cells that respond to green light, 64 samples from black pixel cells that respond to blue light, and 64 samples from black pixel cells that respond to red light.

In some embodiments, the 64 samples can be obtained by reading 8 different, black pixel cells from the same column 8 times (e.g., for each color). In some embodiments, any other suitable number of black pixel cells can be read a suitable number of times (e.g., 16 black pixel cells can be read 4 times, and the like). However, to create a Bayer pattern of pixel cells, generally a 2×2 grid of pixel cells are used (e.g., where the 2×2 grid can include a red pixel cell and a blue pixel cell on a single diagonal, and green pixel cells on the other diagonal). Accordingly, in cases where a pixel array utilizes a Bayer pattern, in order to read one row of black pixel cells data, then two physical rows of pixels cells should be processed. Thus, to retrieve 64 samples, 16 physical rows can be read 8 times when the pixel array is arranged in a Bayer pattern. Similarly, based on the particular layout of the pixel array pattern, reading one row of pixel cell data can require processing one, two, three, or any other suitable number of "physical rows" of pixel cells. Moreover, although a RMS ratio of 8:1 and a number of black pixel cell samples of 64 is described above, this is for the purpose of illustration and not for limitation. Rather, one skilled in the art could appreciate that any other suitable RMS ratio and/or number of samples could alternatively be used. For example, in some cases an imaging system can use 64 samples, 128, samples, 256 samples, or any other suitable number of samples. In some embodiments, the imaging system can provide a programmable option for choosing between 64, 128, 256, or any other suitable number of options. This option may, for example, provide a tradeoff between a higher quality image and a slower frame rate.

In some embodiments, however, an imaging system may not physically be capable of achieving an RMS ratio of 8:1 or greater. For example, when the pixel arrays are formed in silicon (e.g., or formed in a microchip wafer of another suitable material), the RMS ratio of the real pixel temporal noise to the column fixed pattern noise may rather be characterized around 6:1 or 7:1. Accordingly, in these cases, various processing and/or signal readout techniques can be used to decrease the imaging system's noise and increase the RMS ratio. As used herein, this RMS ratio of the real pixel temporal noise to the real column fixed pattern resulting solely from the physical characteristics of the imaging system (e.g., without performing image processing, signal readout techniques, and the like) can be referred to as the "physical RMS ratio."

In some embodiments, this "non ideal" physical RMS ratio of less than 8:1 can be caused by one or more columns of the pixel array having a column FPN that is substantially different from the average RMS fixed pattern noise value of the pixel array. For example, one or more columns of the array can have a peak-to-peak noise value that is much greater than the average peak-to-peak noise value of the entire pixel array, thus causing this column's fixed pattern noise to be more readily visibly (e.g., since it stands out against the background noise). In some cases, the column's non-average fixed pattern noise can be caused by a "non-ideal black pixel cell," such as a defect black pixel and/or a radio telegraph signal ("RTS") black pixel. For example, a defect black pixel can include a black pixel cell that always generates a signal that is inaccurately too high or too low. An RTS black pixel can include a black pixel cell that generally exhibits discrete noise level of 2 or 3 levels. For example, when an RTS black pixel exhibits 2 levels of noise (e.g., that can be defined by 0 and 1), that pixel cell may fluctuate between exhibiting either noise or no noise. An RTS black pixel that varies its noise level frequently and/or a defect black pixel can thus inaccurately raise that column's average fixed pattern noise level. This, in turn, can cause that column to have a calculated correction coefficient that is too high and which is not correlated with the rest of the pixel array. In other words, the correction coefficient that is calculated for a column including non-ideal pixels may not accurately reflect the "real" noise level of that column. This inaccurate correction coefficient may then affect subsequent processing of the image, resulting in calculations that do not correctly or effectively remove image noise. Moreover, since a column may be read several times (e.g., 8 rows can be read 8 times) to determine the correction coefficient, the defect and/or RTS black pixel can be used in the correction coefficient calculation several times, thereby increasing the inaccuracy of the correction coefficient.

In addition to being used to correct for column-wise fixed pattern noise, optical black pixel cells can also be used for other correction processes such as black-level calibration, channel balancing, and the like. For example, black-level calibration can include a testing and/or configuration process that compensates for signal offsets caused by the pixel array's black-level (e.g., a non-zero signal resulting from dark current). Channel balance correction can include offsets caused by multiple readout channels of an imaging device, where each readout channel may have a varying offset. The optical black cells can thus be used in channel balance correction to compare the readouts from the multiple channels against a pre-determined reference level, thereby allowing for the calculation of a channel correction factor. Accordingly, since black-level calibration and channel balance correction may also utilize the black pixel cells, these processes may also be adversely affected by the non-ideal black pixel cells (e.g., defect pixel cells and/or RTS pixel cells).

In some embodiments, to correct for such non-ideal black pixel cells, a technique referred to herein as "SHS and SHR equal timing" can be used. In SHS and SHR equal timing, the reset signal (e.g., $V_{RST}$) and the signal level (e.g., $V_{SIG}$) of the black pixels can both be sampled at the time. For example, the SHS and SHR command signals can be enabled simultaneously. Then, by taking the difference of the reset signal and the signal level (e.g., $V_{OUT}=V_{RST}-V_{SIG}$), the pixel cell's noise can be cancelled out. In other words, the SHS and SHR equal timing scheme can effectively cancel out the pixel noise caused by non-ideal pixel cells. However, this SHS and SHR equal timing technique may not take into account column circuitry, and thus its calculated correction coefficient may not account for column structure noise. Moreover, oftentimes column circuitry such as the amplifier, multiplexers, sample and hold circuitry, and the like, can be a large source of column fixed pattern noise. Accordingly, since the SHS and SHR equal timing scheme may not take column structure noise into account, then it may fail to correct for a relatively large portion of the pixel array's column fixed pattern noise. Additionally, the SHS and SHR equal timing scheme may not provide information for correcting horizontal shading (e.g., resulting from the pixel array and/or column circuitry)

Figure 3:
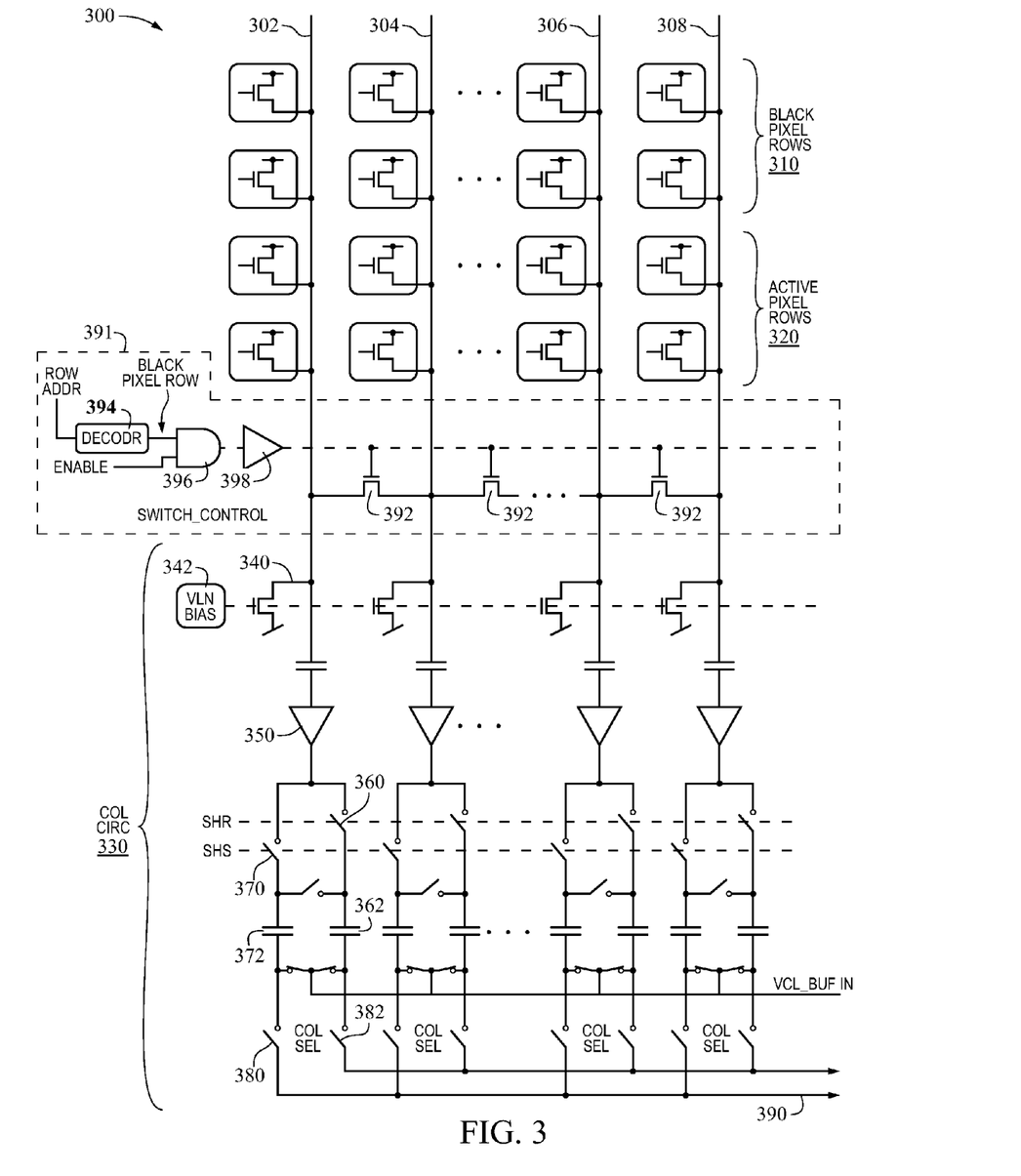
FIG. 3 shows a schematic view of an illustrative imaging system including shunting circuitry in accordance with some embodiments of the invention.

In some embodiments, therefore, techniques other than SHS and SHR equal timing can be used to correct noise caused by non-ideal black pixel cells, where these other techniques do provide noise correction information for column circuitry and/or horizontal shading. In other words, these techniques can calculate a correction coefficient that does correct for column circuitry noise and/or horizontal shading. For example, FIG. 3 shows an illustrative schematic view of imaging system 300. Imaging system 300 can provide for an optical black pixel cell readout technique that can correct for noise caused by non-ideal pixels as well as providing information to correct for column structure noise and/or horizontal shading. Similar to imaging system 200 of FIG. 2, imaging system 300 can include one or more columns (e.g., columns 302, 304, 306, and 308), one or more row of black pixel cells 310, one or more rows of active pixel cells 320, column circuitry 330, and output lines 390. Also similar to imaging system 200, column circuitry 330 can include, for example, VLN bias circuitry 340, VLN Bias control 342, amplifier 350, SHR select 360, SHR storage 362, SHS select 370, SHS storage 372, and column selects 380 and 382. In some embodiments, imaging system 300 can include a system with both top and bottom signal readout such as, for example, where the bottom signal readout may be for a single color.

Dissimilar to imaging system 200 of FIG. 2, however, imaging system 300 can include shunting circuitry 391. Shunting circuitry 391 can include one or more instance of switch 392. Switch 392 can include, for example, an NMOS switch, or any other suitable device that can couple and de-couple two entities together. Each instance of switch 392 can couple on one end to a first column line and may couple on the other end to a second column line. In this manner, by enabling and disabling the instances of switch 392, the column lines of the pixel array can be coupled together and de-coupled, respectively. Although the instances of switch 392 are illustrated in FIG. 3 as coupling two adjacent column lines, this is for the purpose of illustration and not for limitation. Rather, one skilled in the art could appreciate that each instance of switch 392 can couple any two suitable column lines together, regardless of whether or not these column lines are physically adjacent to one another. Moreover, although FIG. 3 illustrates the instances of switch 392 as coupling all column lines of the pixel array together, in some cases only a subset of the column lines may be coupled together. For example, in some embodiments, imaging system 300 can include one more columns including barrier pixels (e.g., pixel cells that can accumulate charge, thereby isolating adjacent structures, such as active pixel cells, from this potential source of noise) that may not be coupled together through switch 392.

The instances of switch 392 can each be controlled by any suitable command signal. For example, in FIG. 3, the switches are illustrated as being controlled by the command signal, "Switch_Control." For example, the instances of switch 392 can be enabled (e.g., and thus can couple the column lines together) when the Switch_Control signal is logic high and can be disabled (e.g., and thus de-coupling the column lines) when the Switch_Control signal is logic low. The Switch_Control signal can be generated by any suitable circuitry. For example, in some embodiments the Switch_Control signal can be generated by the column logic control block of the pixel array. As an illustration, FIG. 3 shows circuitry including decoder 394, AND GATE 396, and buffer 398 that can be used to generate the Switch_Control signal. However, one skilled in the art could appreciate that any other suitable circuitry could be used to generate a control signal for operating the instances of switch 392. For example, in some embodiments a NAND gate followed by an inverting buffer may alternatively be used.

Decoder 394 can receive the row address (e.g., through the Row_Address command signal) of the current pixel row of interest. For example, the "current pixel row of interest" can include a row of pixels that is being sampled by imaging system 300. Decoder 394 may then output an appropriate signal (e.g., through the Black_Pixel_Row command signal) to indicate whether the row address corresponds to a row including black pixel cells. For example, in response to the current pixel row of interest including black pixel cells, decoder 394 can output a logic high on the Black_Pixel_Row command signal. As another example, in response to the current pixel row of interest including active pixel cells, barrier pixel cells, or other non-black pixel cells, decoder 394 can output logic low on the Black_Pixel_Row command signal.

As used herein, the function provided by shunting circuitry 391 can be referred to as the "shunted black pixel cell readout function." Imaging system 300 can use the Enable command signal to enable and disable this shunted black pixel cell readout function. For example, the Enable command signal can be generated by a static register (not pictured) of imaging system 300. As shown by FIG. 3, the Black_Pixel_Row signal and the Enable signal can be provided as inputs to AND GATE 396. In this case, an Enable signal of logic high can enable the shunted black pixel cell readout function of imaging system 300 while an Enable signal of logic low can disable this function. The output of AND GATE 396 may then be buffered by buffer 398 and then provided as the Switch_Control signal to the instances of switch 392.

Figure 4:
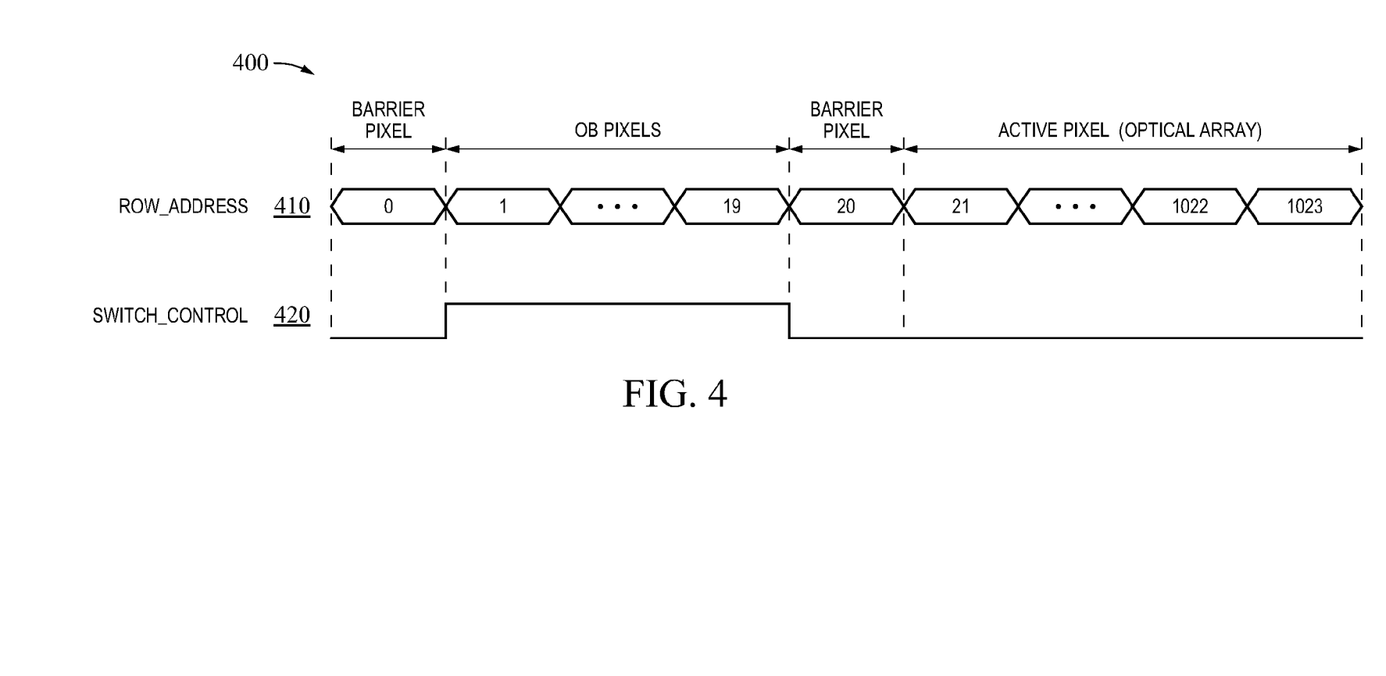
FIG. 4 shows a timing diagram of the control logic of the imaging system of FIG. 3 in accordance with some embodiments of the invention.

FIG. 4 shows illustrative timing diagram 400 of the control logic of the shunted black pixel cell readout function in imaging system 300 of FIG. 3. Timing diagram 400 can include a Row_Address 410 signal and a Switch_Control 420 signal that can correspond to, for example, the Row_Address and Switch_Control signals of FIG. 3, respectively. Row_Address 410 can consecutively output pixel row addresses of the imaging system. For example, Row_Address 410 is illustrated as outputting the pixel row addresses from row 0 to row 1023. Moreover, FIG. 4 illustrates that row 0 and row 20 correspond to barrier pixels, rows 1-19 correspond to optical black pixels, and rows 21-1023 correspond to active pixels. However, this breakup of pixel cells is merely for the purpose of illustration, and one skilled in the art could appreciate that the active pixel cells, optical black pixel cells, barrier pixel cells, or other suitable pixel cells of the pixel array could alternatively be defined by any other suitable row numbering.

As shown by timing diagram 400, in response to the current row of interest corresponding to optical black pixel cells (e.g., rows 1 through 19), the Switch_Control 420 signal can output logic high, thereby enabling the switches (e.g., switches 392 of FIG. 3) and shunting the columns of the pixel array together. As described above, in some embodiments rather than shunting all columns of the pixel array together, column lines including barrier pixels and the like may not be shunted together when the Switch_Control 420 signal is enabled. In response to the current row of interest not including an optical black pixel cell (e.g., row 0, row 20, and/or rows 21 through 1023), the Switch_Control 420 signal can output a logic low, thereby disabling the switches and de-coupling the columns of the pixel array. In other words, the Switch_Control 420 signal may only be asserted when a row address pointer is pointing to the optical black rows of the pixel array. In this manner, a shunted black pixel cell readout function can selectively shunt the columns of a pixel array together only during an optical black pixel cell readout phase of the imaging system.

Shunting the columns of the pixel array together in this manner during an optical black pixel cell readout phase can result in a "winner takes all" behavior of the columns, such that non-ideal pixel cells are excluded from the calculation of that column's correction coefficient. For example, as described above, each optical black pixel cell can include a source follower transistor, such as source follower 108 of FIG. 1. A non-ideal black pixel cell can generate an inaccurately high signal at its floating diffusion region (e.g., floating diffusion region B of FIG. 1). In response to the abnormally high signal at the floating diffusion node B (e.g., which is also the gate of the source follower), the source follower is pulled to a lower-than-normal voltage, defined herein as $V_{GATE\_SF}$. The source of the source follower transistor is coupled to the averaging point of the column through the pixel cell's row select transistor (e.g., row select transistor 110 of FIG. 1) and experiences the voltage level defined herein as $V_{SOURCE\_SF}$. Ideally, each optical black pixel cell of the pixel array should output identical or close values. However, due to the non-ideal pixel cell having the lower-than-normal $V_{GATE\_SF}$, the average of the optical black pixel cells at that particular column may now have an inaccurately low value, thus introducing noise into the imaging system. Accordingly, during the optical black pixel readout phase, the column lines can be shunted together, thus setting $V_{SOURCE\_SF}$ at an average dark level voltage of the row of black pixel cells. In order for a transistor to be turned on, the gate voltage of a transistor should satisfy:

$$V_G > V_S + V_{TH} \qquad 2$$

where $V_G$ is the gate voltage of the transistor, $V_S$ is the source voltage of the transistor, and $V_{TH}$ is a predefined threshold voltage of the transistor (e.g., 0.7 volts, or any other suitable threshold voltage). However, as described above, the gate of the source transistor of the non-ideal pixel cell experiences an abnormally low voltage (e.g., that is much lower than the average $V_{GATE\_SF}$ of the properly functioning black pixel cells) while its source is at the average dark level voltage of the row of shunted black pixel cells. Accordingly, the gate voltage of the non-ideal black pixel cell may not be high enough to satisfy equation (2), and the non-ideal pixel cell is turned off. In other words, systems utilizing a shunted black pixel cell readout function (e.g., such as systems 300 and 400) can operate similar to an analog domain filter that filters out that non-ideal pixel cells. In this manner, due to the shunting of the columns, the non-ideal black pixel cells are disabled, thus resulting in a calculated correction coefficient that can be more accurate and is not adversely affected by the inaccurate readout signals of the non-ideal pixel cells.

In addition to providing a more accurate correction coefficient, such systems can be implemented with minor circuitry and timing additions, and thus can be area and timing efficient.

Furthermore, shunting the column lines together during the optical black readout phase may not only remove noise due to non-ideal pixel cells, yet can also retain information related to column structure noise (e.g., thus allowing column structure noise to be effectively removed by, for example, subsequent image processing). In some cases, however, horizontal shading stemmed within the pixel array may not be obtained when the column lines are shunted together during the optical black pixel readout phase because the pixel array is in front of the shunting point along the signal path. In this case, the pixel array can be provided with a uniform connection to ground and/or a better driving capability of the row driver and booster. This may, for example, eliminate or substantially reduce the presence of horizontal shading stemmed within the pixel array. In other words, by designing the imaging system such that it does not exhibit a significant amount of horizontal shading stemmed within the pixel array (e.g., through pixel array ground uniformity and/or row/driver booster drivability) and by shunting the column lines together during the optical black pixel readout phase, an imaging system can be provided that effectively removes noise due to non-ideal pixel cells, and horizontal shading caused by column circuitries that are after the shunting point along the signal path.

Figure 5:
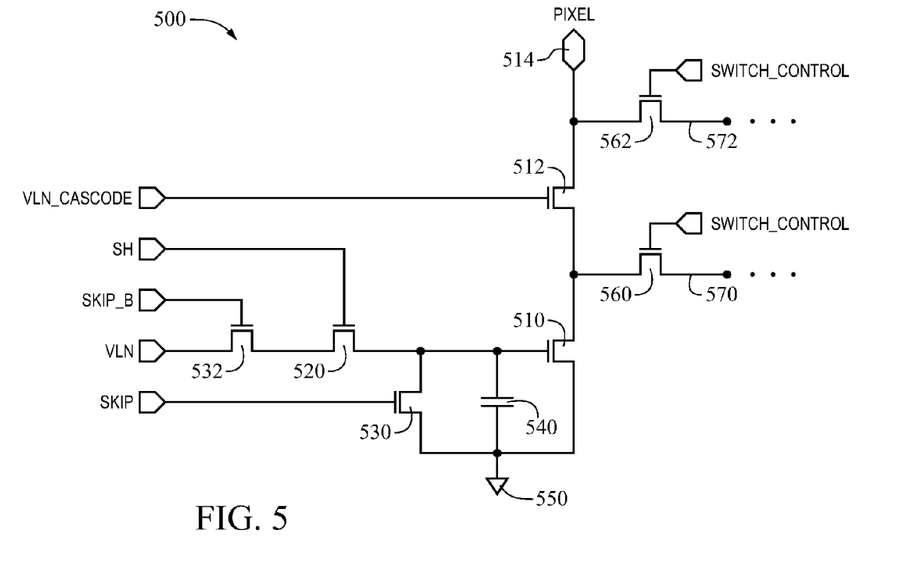
FIG. 5 shows a schematic view of switches implemented in a VLN block in accordance with some embodiments of the invention.

The switches for shunting the column lines together can be provided in any suitable location of the imaging system. For example, as illustrated in FIG. 3, in some embodiments the switches (e.g., switches 392) can be provided before all or most of the column circuitry. Generally, when the column lines are shunted together, noise information regarding column circuitry after the shunting can be maintained and noise information regarding column circuitry before the shunting can be lost. In other words, any source that causes column FPN and resides in front of the shunting point along the signal path may not be removable, while any source that causes column FPN and resides after the shunting point along the signal path can be removed. Accordingly, in some embodiments, the column lines can be shunted together at a location before as much of the column circuitry as possible. In some embodiments, the switches and their corresponding circuitry can be implemented as their own individual block that is separate from the other circuitry of the imaging system. Alternatively, in some embodiments, the switches and their corresponding circuitry can be implemented within other blocks of the imaging system. For example, FIG. 5 shows illustrative schematic of VLN block 500 of an imaging system, where the switches and their corresponding circuitry can be implemented within VLN block 500. For example, an instance of VLN block 500 can be coupled to each column line of the imaging system.

VLN block 500 can include any suitable circuitry for creating a VLN bias for its respective column line. For example, VLN block 500 is illustrated in FIG. 5 as including VLN transistor 510, VLN cascode transistor 512, sample/hold transistor 520, skip transistor 530, skip_b transistor 532, and capacitor 540. However, this particular configuration is for the purpose of illustration and not limitation, and one skilled in the art could appreciate that any other suitable configuration of suitable devices could alternatively be used for providing the VLN bias. For example, the VLN bias is illustrated in FIG. 5 as being configured in a cascode configuration including VLN transistor 510 (e.g., that can operate as a VLN input node) and VLN cascode transistor 512. However, in some embodiments, any suitable configuration other than a cascode configuration could alternatively be used.

VLN transistor 510 and VLN cascode transistor 512 can receive inputs from the command signals, VLN and VLN_Cascode, respectively. These command signals may, for example, be generated from driving circuitry of VLN block 500. For example, the VLN and VLN_Cascode command signals could be generated by a device such as VLN Bias control 242 of FIG. 2. Input 514 can couple to VLN block 500's respective column line and can receive the Pixel signal (e.g., where the Pixel signal can correspond to signals generated by pixel cells and the like that are coupled to that column line). The Pixel signal can, in turn be received by the drain of VLN cascode transistor 512. Sample/hold transistor 520 can be controlled by the SH command signal and can enable the sample/hold function of VLN block 500. Skip transistor 530 and skip_b transistor 532 can be controlled by, respectively, the Skip and Skip_b command signals and can enable and disable the VLN bias for the respective column line of VLN block 500. For example, the VLN bias can be disabled when the pixel cells of VLN block 500's respective column line are not being sampled. VLN block 500 can be grounded by ground 550.

The shunting circuitry for the imaging system can be provided by adding a switch (e.g., an NMOS switch or any other suitable switch) to couple VLN block 500 to another VLN block of the imaging system. In this manner, the switch can couple two column lines together. Since VLN block 500 is arranged in a cascode configuration, then switches should be provided at both the drain of VLN transistor 510 and the drain of VLN cascode transistor 512. For example, switch 560 can be coupled to the drain of VLN transistor 510 and switch 562 can be coupled to the drain of VLN cascode transistor 512. Switches 560 and 562 may each be coupled on their other ends (e.g., ends 570 and 572) to a different VLN block of the imaging system. In other embodiments, such as when VLN block 500 is not arranged in a cascode configuration, then a single switch or three or more switches may be used to perform the shunting function. Switches 560 and 562 can correspond to any suitable switches for shunting two column lines together, such as, for example, switch 392 of FIG. 3.

In this manner, switches such as switches 560 and 562 can act as a "dangling" bond. For example, when the Switch_Control input is low, then switches 560 and 562 are turned off, thus resulting in a dangling bond that disconnects the column lines. However, when the Switch_Control input is high, then switches 560 and 562 are turned on and act as bridges coupling the column lines together.

Figure 6:
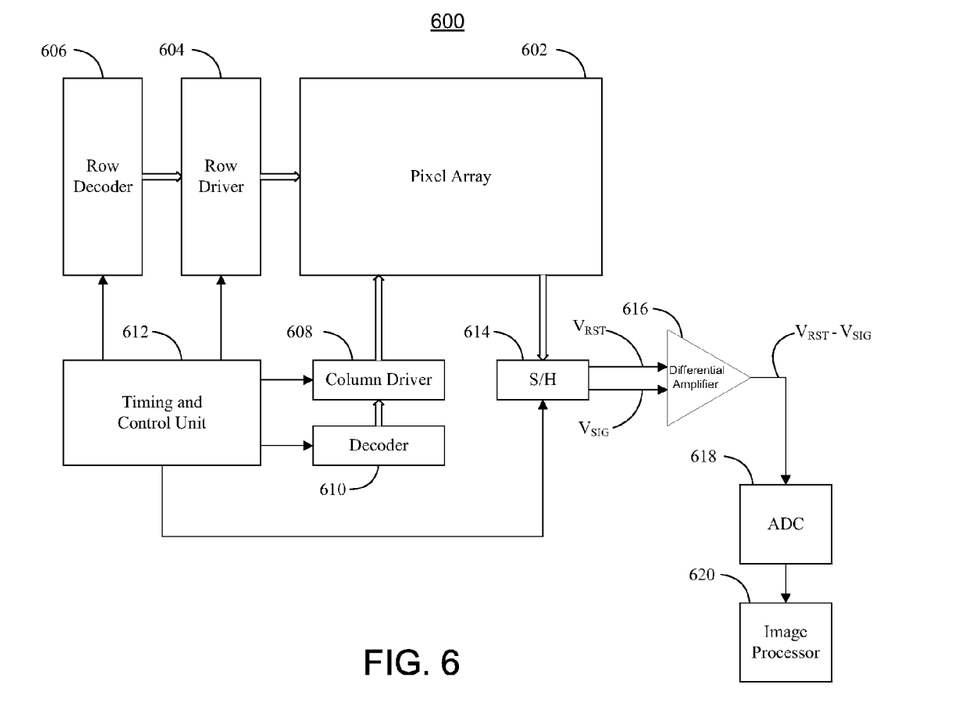
FIG. 6 shows a schematic view of an illustrative imaging system in accordance with some embodiments of the invention.

The systems and methods described above can be implemented in hardware, software, or in any combination of hardware and software. For example, FIG. 6 shows a schematic view of imaging system 600 that can be used for optical black pixel readouts. For example, in some embodiments, imaging system 600 could represent a CMOS imagining system.

Imaging system 600 can have pixel array 602 that can included pixels cells arranged in a predetermined number of columns and rows. Each column may be coupled to its respective column line, and the column lines may be switchably coupled together through a series of switches (e.g., such as switches 392 of FIG. 3, and the like). In operation, rows of pixel cells of pixel array 602 can be selectively activated and/or read from pixel array 602. For example, the rows can be selectively activated by row driver 604 in response to row driver 604 receiving a row address from row decoder 606. Similarly, columns of pixel cells of pixel array 602 can be selectively activated and/or read from pixel array 602. For example, the columns can be selectively activated by column driver 608 in response to column driver 608 receiving a column address from column decoder 610. Accordingly, each pixel cell of pixel array 602 can be selectively activated and/or read from pixel array 602 by providing the appropriate row and column address with, respectively, row decoder 606 and column decoder 610. Timing and control unit 612 can instruct row decoder 606 and column decoder 610 to select an appropriate row and column line in order to read a particular pixel. Furthermore, timing and control unit 612 can instruct row driver 604 and column driver 608 to apply an appropriate driving voltage to the drive transistors of the selected row and column lines.

Imaging system 600 can include sampling and hold circuitry ("S/H") 614 that can be controlled by timing and control unit 612. For example, S/H 614 can include components such as SHR select 360, SHR storage 362, SHS select 370, and SHS storage 372 of FIG. 3, or any other suitable components. During sampling of the pixel cells, each pixel cell of pixel array 602 can output a reference level ("$V_{RST}$") and a signal level ("$V_{SIG}$"), which may be received by S/H 614. For example, S/H 614 may receive $V_{RST}$ and $V_{SIG}$ for a particular pixel cell when that pixel cell is selected by row decoder 606 and column decoder 610. S/H 614 can sample, hold, and/or amplify $V_{RST}$ and $V_{SIG}$. For example, in some embodiments, S/H 614 can include capacitors, where one capacitor can be used to store the $V_{RST}$ signal and one can be used to store the $V_{SIG}$ signal.

S/H 614 may then output $V_{RST}$ and $V_{SIG}$ to differential amplifier 616. Differential amplifier 616 can determine the differential output signal, $V_{OUT}=V_{RST}-V_{SIG}$. This differential signal can represent, for example, the actual pixel output with common-mode noise eliminated.

The differential output signal, $V_{OUT}$, can be digitized by analog to digital converter ("ADC") 618). ADC 618 may then communicate the digitized signals to image processor 620. Image processor 620 can create a digital image from the digitized signals in any suitable manner and can perform any suitable image processing such as, for example, noise reduction, image dewarping, image rotations, image perspective adjustments, image panning, image tilting, imaging zooming, or any other suitable image processing.

In some embodiments, one or more of the components of imaging system 600 can be combined or omitted. In some embodiments, imaging system 600 can include other components not combined or included in those shown in FIG. 6, or several instances of the components shown in FIG. 6. Furthermore, although imaging device 600 has been described with reference to a CMOS imaging system, one skilled in the art can appreciate that any suitable imaging system could be used. For example, the embodiments described herein could be used with a CCD imaging system, or any other suitable imaging system. Additionally, one skilled in the art can appreciate that the pixel cell signals (e.g., $V_{RST}$ and $V_{SIG}$) or processed pixel signals (e.g., $V_{OUT}$, the digitized signal, or any other processed signal) can alternatively be output, stored, and/or filtered in a system external to system 600.

The processes discussed above are intended to be illustrative and not limiting. Persons skilled in the art can appreciate that steps of the processes discussed herein can be omitted, modified, combined, or rearranged, or that any combination of these steps or any additional steps can be performed without departing from the scope of the invention.

It will be apparent to those of ordinary skill in the art that methods involved in the invention may be embodied in a computer program product that includes a machine readable and/or usable medium. For example, such a computer usable medium may consist of a read only memory device, such as a CD ROM disk or conventional ROM device, or a random access memory, such as a hard drive device or a computer diskette, or flash memory device having a computer readable program code stored thereon.

The above described embodiments of the invention are presented for purposes of illustration and not of limitation.

What is claimed is:

1. A method comprising:
receiving a first row address of a pixel array of an imaging system, the pixel array comprising a plurality of rows of pixels, shunting circuitry, and column circuitry, wherein the first row address defines a row of pixels of the plurality of rows of pixels that is currently being sampled;
determining whether the first row address corresponds to a row including at least one optical black pixel cell;
in response to determining the first row address corresponds to a row including at least one optical black pixel cell, enabling a plurality of switches of the shunting circuitry to couple a plurality of column lines of the pixel array together, wherein each of the plurality of column lines couples pixel cells of a corresponding column together; and
in response to not determining the first row address corresponds to a row including at least one optical black pixel cell, disabling the plurality of switches such that the plurality of switches de-couple the plurality of column lines.

2. The method of claim 1, wherein the row of pixels that is currently being sampled comprises:
a row of pixels including at least one pixel cell generating at least one signal corresponding to an amount of light sensed by the at least one pixel cell, wherein the at least one signal is read by the imaging system.

3. The method of claim 1, wherein the at least one optical black pixel cell comprises:
a pixel cell including identical electrical characteristics to an active pixel cell but is unresponsive to light, wherein the optical black pixel cell can operate as a reference pixel for the imaging system.

4. The method of claim 1, wherein the enabling comprises:
generating a command signal applied to a gate of each switch of the plurality of switches, wherein the command signal turns each switch on such that each switch becomes conductive.

5. The method of claim 1, wherein not determining the first row address corresponds to a row including at least one optical black pixel cell comprises:
determining the first row address corresponds to a row consisting of at least one of active pixel cells and barrier pixel cells.

6. The method of claim 1, wherein the plurality of column lines comprise all column lines of the pixel array apart from column lines corresponding to barrier pixel cells.

7. The method of claim 1, further comprising:
receiving a next row address of the pixel array, wherein the next row address defines a next row of pixels that is now currently being sampled; and
repeating the determining, enabling, and disabling for the next row address.

8. A method for optical black pixel readout of a pixel array of an imaging system, the method comprising:
shunting column lines of the pixel array together during an optical black pixel readout phase of the imaging system, wherein shunting the column lines comprises turning on a plurality of switches coupled in series, wherein each switch of the plurality of switches is coupled on a first end to a first column line and is coupled on a second end to a second column line;
reading out optical black pixel rows of the pixel array; and
removing the shunting of the column lines during an active pixel readout phase of the imaging system.

9. The method of claim 8, further comprising:
removing the shunting of the column lines during a barrier pixel readout phase of the imaging system.

10. The method of claim 8, wherein the plurality of switches comprises a plurality of NMOS transistors.

11. The method of claim 8, wherein the plurality of switches are implemented as an individual block of the imaging system.

12. The method of claim 8, wherein the plurality of switches are implemented as part of a voltage line bias block of the imaging system.

13. The method of claim 8, wherein the active pixel readout phase comprises:
reading a reference signal generated by at least one active pixel cell of the pixel array;
reading a signal level signal generated by the at least one active pixel cell, wherein the signal level signal corresponds to an amount of light sensed by the at least one pixel cell; and
generating an output signal based on the reference signal and the signal level signal.

14. A method for optical black pixel readout of a pixel array of an imaging system, the method comprising:
shunting column lines of the pixel array together during an optical black pixel readout phase of the imaging system;
reading out optical black pixel rows of the pixel array; and
removing the shunting of the column lines during an active pixel readout phase of the imaging system, wherein removing the shunting comprises:
turning off a plurality of switches coupled in series, wherein each switch of the plurality of switches is coupled on a first end to a first column line and is coupled on a second end to a second column line.

15. An imaging system comprising:
a pixel array comprising:
a plurality of pixel cells arranged in a plurality of columns and a plurality of rows; and
a plurality of column lines, wherein each column line corresponds to a separate column of the plurality of columns and wherein each column line couples the pixel cells of the separate column together;
column circuitry coupled to each column line of the plurality of column lines, wherein the column circuitry is operable to sample and process signals generated by the plurality of pixel cells;
shunting circuitry operable to either couple or de-couple the plurality of column lines together; and
control circuitry operable to:
instruct the shunting circuitry to couple the plurality of column lines together during an optical black pixel readout phase of the imaging system; and
instruct the shunting circuitry to de-couple the plurality of column lines during active pixel cell readout phase of the imaging system.

16. The imaging system of claim 15, wherein the shunting circuitry is coupled between the pixel array and the column circuitry.

17. The imaging system of claim 15, wherein the column circuitry comprises:
reference signal circuitry operable to sample and hold reference signals generated by the plurality of pixel cells;
image signal circuitry operable to sample and hold image signals generated by the plurality of pixel cells;
an amplifier operable to amplify the reference signals and the image signals; and
column select circuitry operable to select a particular column of the plurality of columns for processing.

18. The imaging system of claim 15, wherein the control circuitry comprises:
a decoder operable to:
receive a particular row address; and
output a row signal defining whether the particular row address corresponds to a black pixel cell row;
an input operable to receive an enable signal; and
an output operable to:
generate, in response to the row signal defining the particular row address corresponds to a black pixel cell row and the input receiving an enable signal, an output signal instructing the shunting circuit to couple the plurality of column lines; and
generate, in response to either the row signal defining the particular row address does not correspond to a black pixel cell row or the input not receiving an enable signal, an output signal instructing the shunting circuit to de-couple the plurality of column lines.

19. An imaging system comprising:
a pixel array comprising:
a plurality of pixel cells arranged in a plurality of columns and a plurality of rows; and
a plurality of column lines, wherein each column line corresponds to a separate column of the plurality of columns and wherein each column line couples the pixel cells of the separate column together;
column circuitry coupled to each column line of the plurality of column lines, wherein the column circuitry is operable to sample and process signals generated by the plurality of pixel cells;
shunting circuitry operable to either couple or de-couple the plurality of column lines together; and
control circuitry operable to:
instruct the shunting circuitry to couple the plurality of column lines together during an optical black pixel readout phase of the imaging system; and
instruct the shunting circuitry to de-couple the plurality of column lines during active pixel cell readout phase of the imaging system, wherein:
the column circuitry comprises a voltage line ("VLN") bias block including at least a first VLN bias transistor and a second VLN bias transistor arranged in a cascode configuration; and
the shunting circuitry comprises at least first shunting transistors coupled to a drain of the first VLN bias transistor and a second shunting transistor coupled to a drain of the second VLN bias transistor.

* * * * *